United States Patent [19]

Arakawa

[11] Patent Number: 4,693,880

[45] Date of Patent: * Sep. 15, 1987

[54] PROCESS FOR PRODUCING DITHIONITES

[75] Inventor: Satoshi Arakawa, Chiba, Japan

[73] Assignee: Mitsubishi Gas Chemical Company, Inc., Tokyo, Japan

[*] Notice: The portion of the term of this patent subsequent to Jun. 14, 2000 has been disclaimed.

[21] Appl. No.: 240,830

[22] Filed: Mar. 5, 1981

[30] Foreign Application Priority Data

Mar. 6, 1980 [JP] Japan .................................. 55-28432

[51] Int. Cl.$^4$ ............................................. C01B 17/66
[52] U.S. Cl. ..................................................... 423/515
[58] Field of Search ................ 423/515, 516, 512, 199

[56] References Cited

U.S. PATENT DOCUMENTS

| | | | |
|---|---|---|---|
| 2,226,576 | 12/1940 | Park et al. | 423/515 |
| 2,938,771 | 4/1953 | Avedikian | 423/516 |
| 3,917,807 | 11/1975 | Yasue et al. | 423/515 |
| 3,927,190 | 12/1975 | Yoshikawa et al. | 423/515 |
| 4,042,674 | 8/1977 | Yamamoto et al. | 423/515 |
| 4,388,291 | 6/1983 | Arakawa | 423/515 |

FOREIGN PATENT DOCUMENTS

| | | | |
|---|---|---|---|
| 1065095 | 5/1954 | France | 423/515 |
| 46-18373 | 5/1971 | Japan | 423/515 |

OTHER PUBLICATIONS

Skoog et al, Fundamentals of Analytical Chemistry, Holt Rinehart and Winston, NY, NY, 1963, pp. 116–118.

Perry et al, Chemical Engineers Handbook, McGraw Hill Book Co, NY, NY, 1973, pp. 19–80–19–81.

*Primary Examiner*—Gary P. Straub
*Attorney, Agent, or Firm*—Fleit, Jacobson, Cohn & Price

[57] ABSTRACT

A process for producing an anhydrous dithionite which comprises reacting formic acid or a formate, an alkaline compound and sulfur dioxide in the presence of water and an organic solvent, filtering the resulting dithionite crystal from the mother liquor, washing the dithionite crystal with an organic solvent and drying the dithionite crystal, characterized in that in the washing step, the washings first discharged are distilled by a convention method for recovery of the organic solvent, the washings discharged subsequently being used as the reaction solvent without distillation.

1 Claim, No Drawings

PROCESS FOR PRODUCING DITHIONITES

BACKGROUND OF THE INVENTION

This invention relates to a process for producing a dithionite.

In general, in a process for producing an anhydrous dithionite crystal by reacting formic acid or a formate, an alkaline compound and sulfur dioxide in the presence of water and an organic solvent, a dithionite crystal is crystallized in the reaction solution during the reaction. After the reaction completed, the resulting dithionite crystal can be separated from the mother liquor to recover it. However, if the dithionite crystal is dried as it is, purity of the product is lower because impurities contained in the mother liquor remain on the crystal, and water contained in the mother liquor delays the drying and accelerates decomposition of the resulting dithionite. When the decomposing speed of the dithionite is great, the dithionite crystal is likely to burn fire. This is very dangerous.

In order to overcome such shortcomings, it is indispensable to wash the dithionite crystal with an organic solvent, such as methanol or ethanol, thereby removing from the crystal water and impurities-containing mother liquor adhered to the crystal. The mother liquor is transferred to the washings by the washing step. The resulting washings contain thiosulfates, bisulfites, formates and water contained in the mother liquor. Particularly, when the washings containing thiosulfates are used as a solvent for synthesis of a dithionite without distillation, formation of a dithionite is not only prevented, but also decomposition of the dithionite is accelerated. Therefore, in the prior art the washings alone or combination of the washings and the mother liquor are distilled to recover a solvent from the washings or the combination.

For example Japanese Patent Publication (for opposition) No. 38556/1973 discloses recovery of an alcohol from the washings and reuse of the alcohol. However distillation of an organic solvent from the washings requires a great amount of energy. It is necessary from the view point of energy saving to solve such problem.

SUMMARY OF THE INVENTION

The inventor carried out research for overcoming such shortcomings for synthesis of a dithionite. As a result, I found that when the washings are discharged in two stages, the second stage washings hardly contain material, such as a thiosulfate, having a bad effect on synthesis of a dithionite and could be used as a solvent for synthesis of a dithionite without distilling.

This invention relates to a process for producing an anhydrous dithionite which comprises reacting at least one formic compound selected from the group consisting of formic acid, formates and mixtures thereof; at least one alkaline compound; and sulfur dioxide in the presence of water and at least one organic solvent, filtering the resulting dithionite crystal from the mother liquor, washing the dithionate crystal with an organic solvent and drying the dithionite crystal, characterized in that in the washing step, the washings first discharged and the washings discharged subsequently are collected separately, the washings first discharged being distilled by a conventional method for recovery of the organic solvent, and the washings discharged subsequently being used as the reaction solvent without distillation.

DETAILED DESCRIPTION OF THE INVENTION

A dithionite can be prepared by reacting formic acid or a formate, an alkaline compound and sulfur dioxide in the presence of water and an organic solvent. Since solubility of a dithionite in that mixed solvent is little, the resulting dithionite is easily precipitated. After the reaction completes, the resulting dithionite can be recovered by filtering the dithionite from the mother liquor. The mother liquor comprising the raw material, such as the formic compound; an intermediate, such as a bisulfite; a by-product, such as a thiosulfate; water; and the organic solvent is adhered on the dithionite crystal. The crystal is washed with an organic solvent to remove such impurities from the crystal. In the washing step of this invention, the washings first discharged and the washings discharged subsequently are collected separately, only the washings first discharged is distilled by a conventional method for recovery of the organic solvent.

The washings discharged subsequently are used as a solvent for synthesis of a dithionite. The former washings first discharged may be in the range of 20–60% by weight, preferably 30–50% by weight on the basis of weight of the dithionite crystal. It is uneconomical to distill the washings in an amount of more than 60% by weight on the basis of weight of the dithionite crystal. The washings first discharged and the washings discharged subsequently may be collected by washing the dithionite crystal with the whole amount of an organic solvent, followed by discharging the washings in two stages.

Alternatively, an organic solvent for washing may be supplied in two portions, whereby the washings first discharged may be obtained by washing the dithionite crystal with the first portion of solvent, and the washings discharged subsequently may be collected by washing the dithionite crystal with the second portion thereof.

The former method is preferable, because of simplicity and utility.

According to this invention, the washings that contain little materials such as water or a thiosulfate having an adverse effect on the reaction and containing high content of an organic solvent can be recovered, and the washings can be used as a solvent for synthesis of a dithionite without distilling. So, a great amount of energy can be saved.

According to this invention, sodium dithionite, potassium dithionite, zinc dithionite and the like can be produced.

The organic solvents employed in the reaction medium of this invention include, for example, methanol, ethanol, n-propanol, iso-propanol, and acetone. Methanol is preferred. The organic solvent employed for washing the resulting dithionite is preferably the same as the organic solvent employed in the reaction medium. The both may be different from each other. The formic compounds include, for example, formic acid and sodium formate. The alkaline compounds include, for example, sodium hydroxide and sodium carbonate. Other organic solvents, other alkaline compounds and other formic compounds may also be used in this invention. They and detailed reaction conditions are disclosed in U.S. Pat. No. 3,927,190 by Yoshikawa et al, patented on Dec. 16, 1975 which is incorporated herein by reference.

The present invention is illustrated by the following Example. However, the scope of the present invention should not be limited by the Example. Part and percent in the Example are on weight unless otherwise specified.

EXAMPLE 1

Sodium formate (81 parts) was dissolved in hot water (74 parts). Methanol (105 parts) was added to the solution to form slurry. Into a reactor equipped with agitator, thermometer, reflux condenser, a cold trap for collecting low boiling point substances, tanks for dropping raw materials and a heating jacket was charged the slurry. The slurry was heated to 82° C. with stirring at 1.0 Kg/cm$^2$ Gauge. A 50% sodium hydroxide solution (69 parts) and solution of sulfur dioxide (105 parts) in methanol (292 parts) containing methyl formate (16 parts) were separately added dropwise to the slurry over 90 minutes. After these additions, the agitation was continued for 150 minutes at the above temperature and pressure. The resulting reaction mixture was cooled to 73° C. The resulting sodium dithionite crystal was filtered from the reaction mixture under a carbon dioxide atmosphere. Thereafter, methanol (120 parts) was charged into the filter vessel to wash the crystal. Carbon dioxide under pressure is introduced into the filter vessel to allow methanol to pass through the crystal layer. The washing was done in two stages. Washings first discharged (48 parts) and washings discharged subsequently (72 parts) were collected separately. After washing the crystal was dried within a temperature of 75°–90° C. under reduced pressure for 90 minutes to obtain the product, sodium dithionite (116.5 parts). Purity of the product was 92.3%.

The washings discharged subsequently (72 parts) was combined with methanol (33 parts) obtained by distilling the mother liquor and the washings first discharged. The above procedure was repeated except that the combined solution was employed in place of 105 parts of methanol. The yield of sodium dithionite was 116 parts. Purity of sodium dithionite was 92.0%.

The same procedure as the second procedure was repeated. The yield of sodium dithionite was 116 parts. The purity thereof was 92.1%.

The yield and the purity of the resulting sodium dithionite were the same in the second and third procedures using the combined solution in place of pure methanol as those in the first procedure.

Control test 1

The first procedure of Example 1 was repeated except that all of the washings were obtained without separation.

The above procedure was repeated except that 105 parts of the washings without distillation was employed in place of 105 parts of methanol. Purity of the resulting sodium dithionite was 89.5%. Yield of sodium dithionite was 107 parts.

What is claimed is:

1. A process for producing an anhydrous dithionite which comprises reacting at least one formic compound selected from the group consisting of formic acid, formates and mixtures thereof, at least one alkaline compound, and sulfur dioxide in the presence of water and at least one organic solvent, filtering the resulting dithionite crystal from the mother liquor to form a crystal layer, washing the dithionite crystal layer with an organic solvent by adding all of organic solvent used in the washing step in one step and drying the dithionite crystal, the washings from the washing step being discharged in two sequential stages as a first discharge and a subsequent discharge, separately collecting the washings first discharged from the washing step and the washings discharged subsequently, the amount of the washings first discharged is in the range of 20 to 60% by weight based on the weight of the dithionite crystal, distilling the washings first discharged and recovering the organic solvent, and using the washings discharged subsequently without distillation as the reaction solvent.

* * * * *